(12) United States Patent
Zettler et al.

(10) Patent No.: US 6,170,702 B1
(45) Date of Patent: Jan. 9, 2001

(54) BEVERAGE CONTAINER VENDING MACHINE

(76) Inventors: Gehard Zettler; Mathias Runneck, both of Christoph-Lenmann-Str, 21, 67346 Speyer (DE)

( * ) Notice: Under 35 U.S.C. 154(b), the term of this patent shall be extended for 0 days.

(21) Appl. No.: 09/224,751

(22) Filed: Jan. 4, 1999

(30) Foreign Application Priority Data

Jan. 5, 1998 (DE) .......................................... 298 00 069 U

(51) Int. Cl.⁷ ...................................................... B65H 3/00
(52) U.S. Cl. ............................................ 221/192; 221/253
(58) Field of Search ...................................... 221/190, 186, 221/187, 192, 191, 195, 251, 131, 123

(56) References Cited

U.S. PATENT DOCUMENTS 4,483,459 * 11/1984 Taylor et al. ...................... 221/192

FOREIGN PATENT DOCUMENTS

| 11494 | * | 1/1991 | (JP) | ...................................... 221/192 |
| 67387 | * | 3/1991 | (JP) | ...................................... 221/192 |

* cited by examiner

*Primary Examiner*—Kenneth W. Noland
(74) *Attorney, Agent, or Firm*—Klaus J. Bach

(57) ABSTRACT

In a beverage vending machine for dispensing beverages contained in containers disposed in beverage container crates, at least two horizontal storage and transport elements are disposed on top of one another in a storage space of the vending machine for supporting beverage container crates adjacent one another and first drive means are provided for moving the beverage container crates horizontally on the storage and transport elements and second drive means are provided for moving the storage and transport elements vertically and further means are provided for moving the beverage container crates into a dispensing structure from a storage and transport element disposed at the level of the dispensing structure.

7 Claims, 6 Drawing Sheets

BEVERAGE CONTAINER VENDING MACHINE

BACKGROUND OF THE INVENTION

The invention resides in a beverage vending machine for providing and delivering beverages contained in containers, the vending machine including a storage space and a dispensing compartment.

Such beverage vending machines are known in the art and are generally used for dispensing bottled or canned beverages. Vending machines have the advantage that no sales personnel is needed and that they can be operated independently of store hours. As a result, beverages can be purchased at any time.

However, these vending machines are not suitable for dispensing a relatively large amount of beverages. Since every can or bottle needs to be individually removed from the apparatus, the dispensing of a larger amount of beverages is awkward and time consuming.

In addition, it provides for a large amount of individual cans or bottles which are difficult to carry or which make it necessary for the purchasers to bring along transport containers.

If a large amount of beverages is needed, they are generally ordered for home delivery or they are purchased at beverage distributorships. This can be done however only during normal business hours. It is, therefore, impossible to purchase larger amounts of beverages outside the normal business hours in a simple manner. Also, sales personnel is needed for the sale of beverages by beverage distributorships.

It is the object of the present invention to provide a beverage vending machine which can dispense large amounts of beverages in a simple manner.

SUMMARY OF THE INVENTION

In a beverage vending machine for dispensing beverages contained in containers disposed in beverage container crates, at least two horizontal transport elements are disposed on top of one another in a storage space of the vending machine for supporting beverage container crates adjacent one another and first drive means are provided for moving the beverage container crates on the transport elements horizontally and second drive means are provided for moving the transport elements vertically and further means are provided for moving the beverage container crates from a transport element disposed at the level of the dispensing structure into a dispensing structure from where tey can be removed by a customer.

Since the beverage containers are disposed in beverage cases and are dispensed by the vending machine contained in such cases, a large amount of beverages can be taken from the vending machine in a simple and efficient way. By arranging the beverage cases on transport elements in rows one behind the other or in side-by-side relationship and disposing several transport elements on top of one another, a highly compact storage space for the beverage cases is provided. The beverage cases are arranged in the storage space essentially in a way as if they were piled on top of each other. However, since the beverage cases are disposed one behind the other on horizontally extending transport elements and first means are provided for moving the beverage cases horizontally, the beverage cases can be easily dispensed by the beverage vending machine. It is only necessary herefor that the transport element is disposed at the same level as the dispensing compartment, so that a beverage case can be moved by the first means into the dispensing compartment.

When all the beverage cases disposed in a vending machine on a particular transport element are dispensed the transport elements are moved vertically by a second means until another transport element carrying beverage cases is disposed at the level of the dispensing compartment. Then the beverage cases on the other transport element can be moved into the dispensing compartment by the first means.

In a particular embodiment of the invention, the transport elements are conveyor belts which include a drive shaft provided with a drive wheel. The beverage cases disposed on the conveyor belt can easily be moved into the dispensing compartment. Conveyor belts also have the advantage that they can be operated by a simple drive such as an electric motor.

However, the transport elements may also be a series of parallel drums or rollers. For moving the cases, the drums or rollers must be rotated or the cases must be pushed by cylinders. If the cases are moved by a cylinder, the transport elements may be just level smooth support surface.

In another embodiment of the invention, the transport elements are guided in vertically arranged guide rails and are interconnected by variable elements. In this case, it is particularly advantageous if the second means is connected to the uppermost transport element.

With the interconnection of the transport elements by variable elements, the transport elements can be positioned one after the other at the level of the dispensing compartment in a simple manner.

To achieve this, only the uppermost transport element needs to be lowered, whereby all the transport elements disposed below the uppermost transport element are lowered.

When the transport elements are so far lowered that lowermost transport element is disposed on the floor the following transport elements may be seated on the lower transport element without gap since the variable elements are flexible, preferably jointed elements such as chains: with such an arrangement, the space required for the empty transport elements is relatively small.

Preferably only so many transport elements are arranged on top of each other that, when disposed on top of each other without beverage crates, they reach only up to the bottom edge of the dispensing compartment.

In another advantageous embodiment of the invention, the first means is connected to the drive wheel of that conveyor belt which is at the level of the dispensing compartment. Since the conveyor belts have only a single drive wheel and the first means is disposed at the level of the dispensing compartment, it is not necessary to provide for each transport element separate means for moving the beverage crates horizontally. The respective drive wheel is coupled to the first means only while the conveyor belt is at the level of the dispensing compartment. The coupling may be established by a common clutch.

In another embodiment of the invention, the transport elements include guide rails by which the beverage crates are guided at their sides. With the guide rails, beverage crates of different widths can be moved on the transport elements. It is only necessary to adapt the guide rails to the width of the crates. In this way, a beverage vending machine according to the invention can be easily converted for the accommodation of different beverage crates and different types of beverages.

It has been found to be particularly advantageous if the dispensing compartment is in the form of a lock gate. This facilitates safe dispensing of a beverage crate and prevents the unauthorized removal of a beverage crate from the dispensing compartment.

Further features of the invention will become apparent from the following description of an embodiment on the basis of the accompanying drawings.

DESCRIPTION OF A PREFERRED EMBODIMENT

Figure 1:
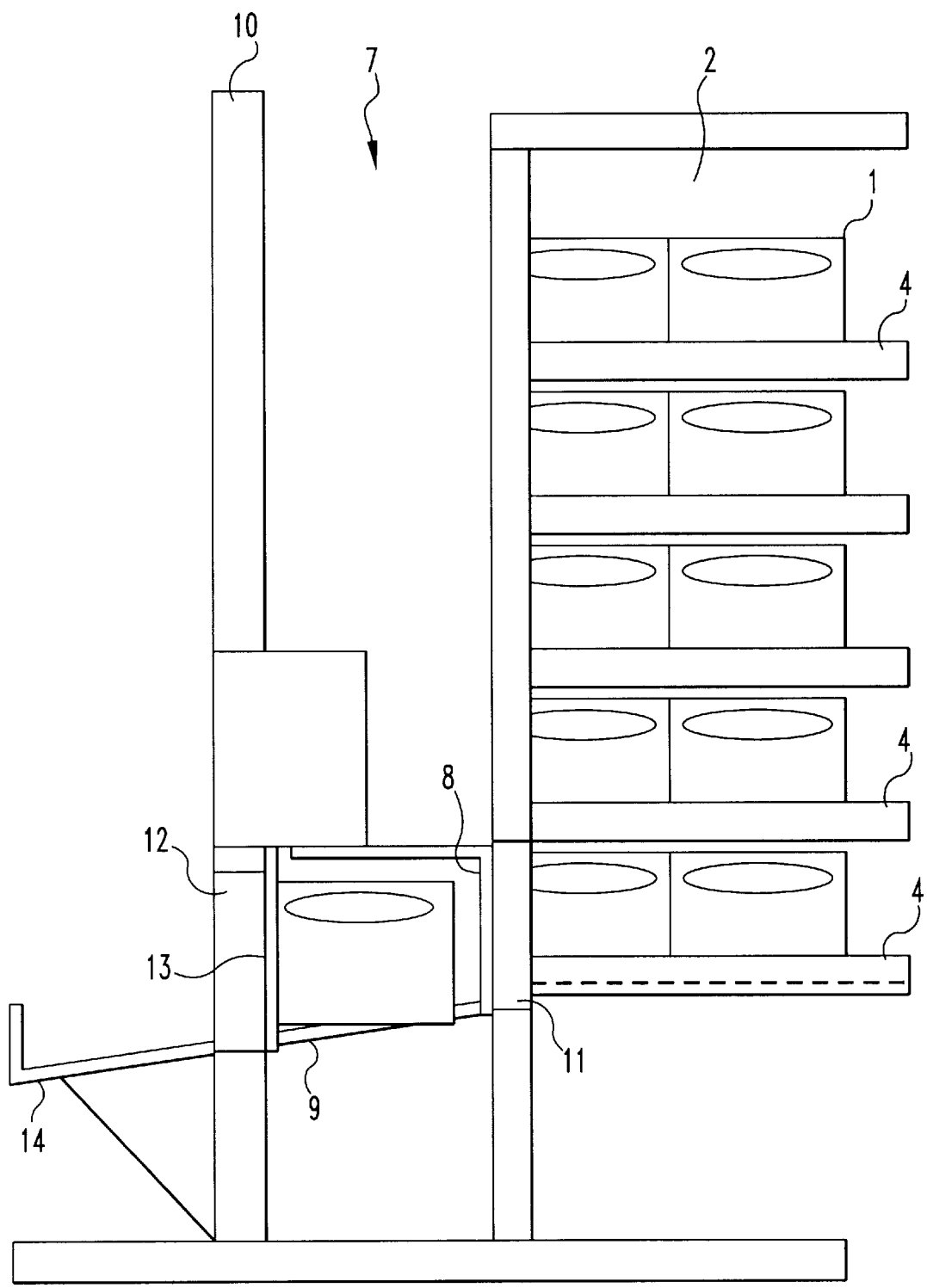
FIG. 1 is a schematic side view of a beverage vending machine in a first operating position.
Figure 2:
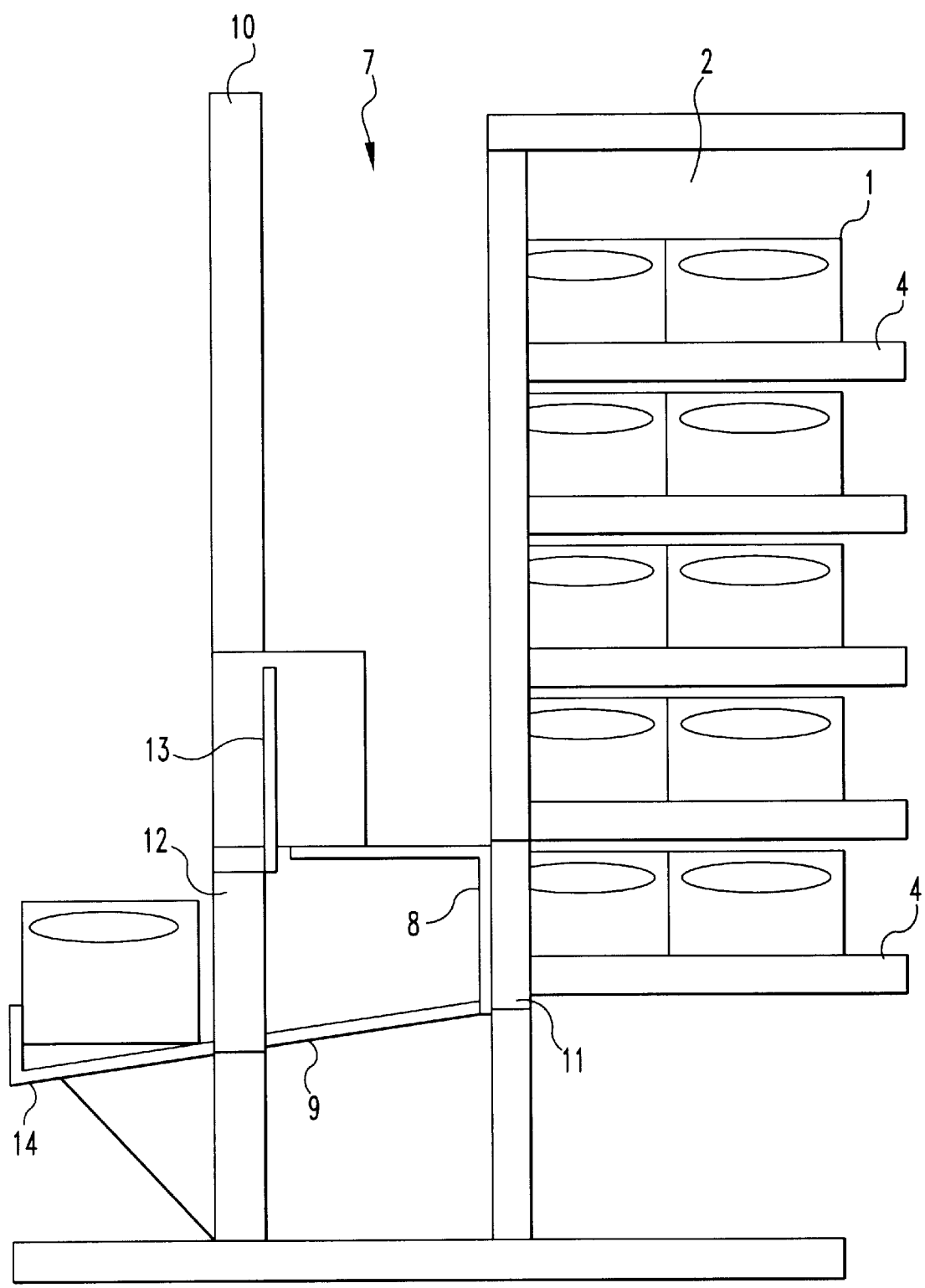
FIG. 2 shows the beverage vending machine of FIG. 1 in a second operating position.
Figure 3:
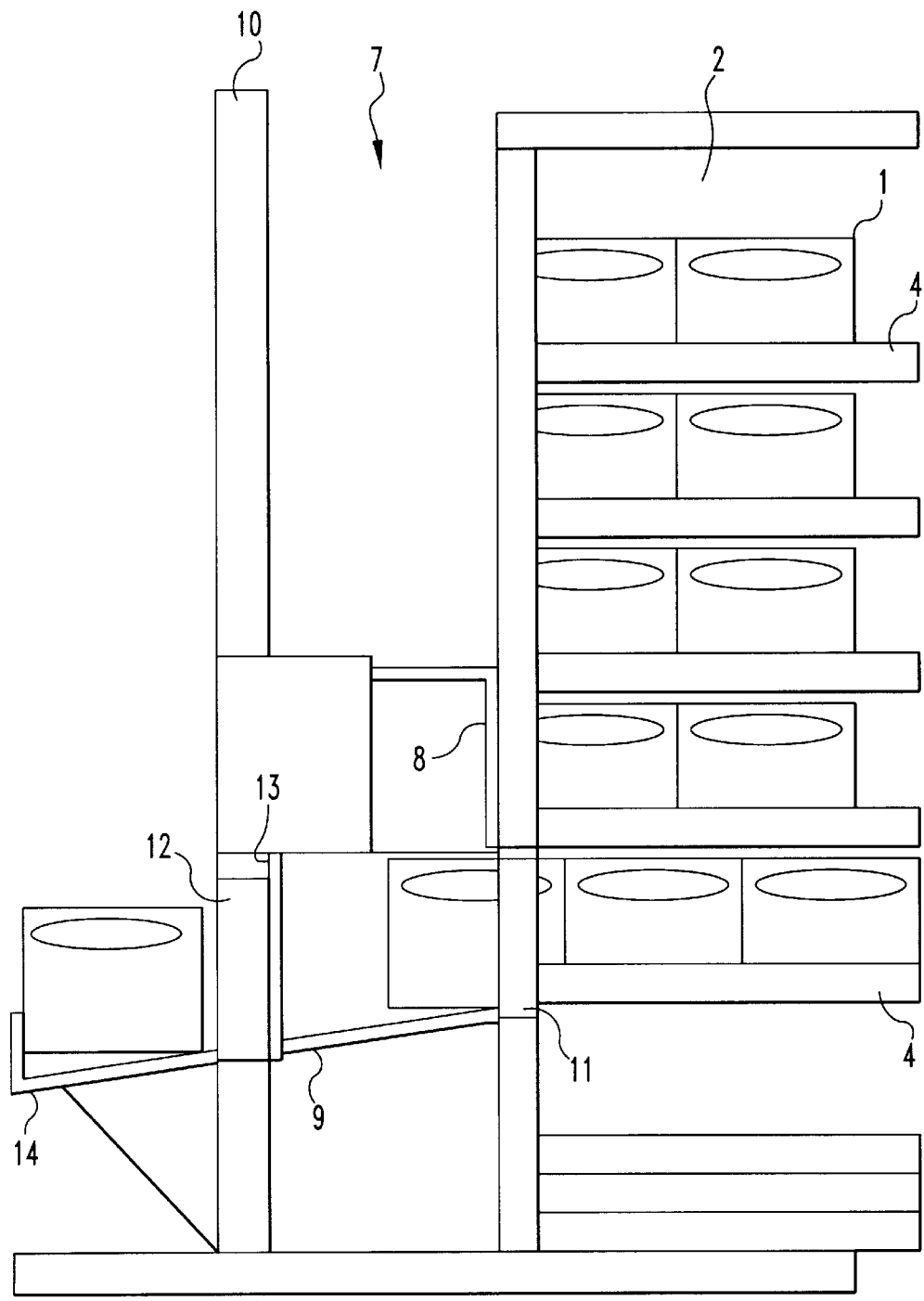
FIG. 3 shows the beverage vending machine in a third operating position.

As shown particularly in FIGS. 1 to 3, in a beverage vending machine according to the invention, beverage crates 1 are disposed behind one another on transport elements 4. The transport elements 4 with the beverage crates 1 are disposed in a closed storage space 2. The transport elements are conveyor belts and are arranged on top of one another. Although FIGS. 1 to 3 show only transport elements 4, which are arranged on top of one another and on each of which two beverage crates are disposed behind one another, suitably ten conveyor belts are disposed on top of one another and ten beverage grates are arranged on each level behind one another.

At the level of the lower conveyor belt 4, the storage space 2 has a first opening 11 through which the beverage cases 1 can be moved into the intermediate space 7. The first opening 11 can then be closed by a first sliding door 8.

Below the first opening 11, a dispensing conveyor is disposed in the intermediate space 7. The dispensing conveyor 9 extends from the first opening 11 up to a second opening 12 formed in the outside wall 10 of the beverage vending machine. The second opening 12 can be closed by a second sliding door 13.

Outside the intermediate space 7, a removal element 14 is arranged below the second opening 12. The removal element 14 is provided with a stop at its end remote from the outside wall 10 of the vending machine. In addition, the removal element 14 includes preferably slide rollers on which the beverage case can move up to the stop.

Figure 5:
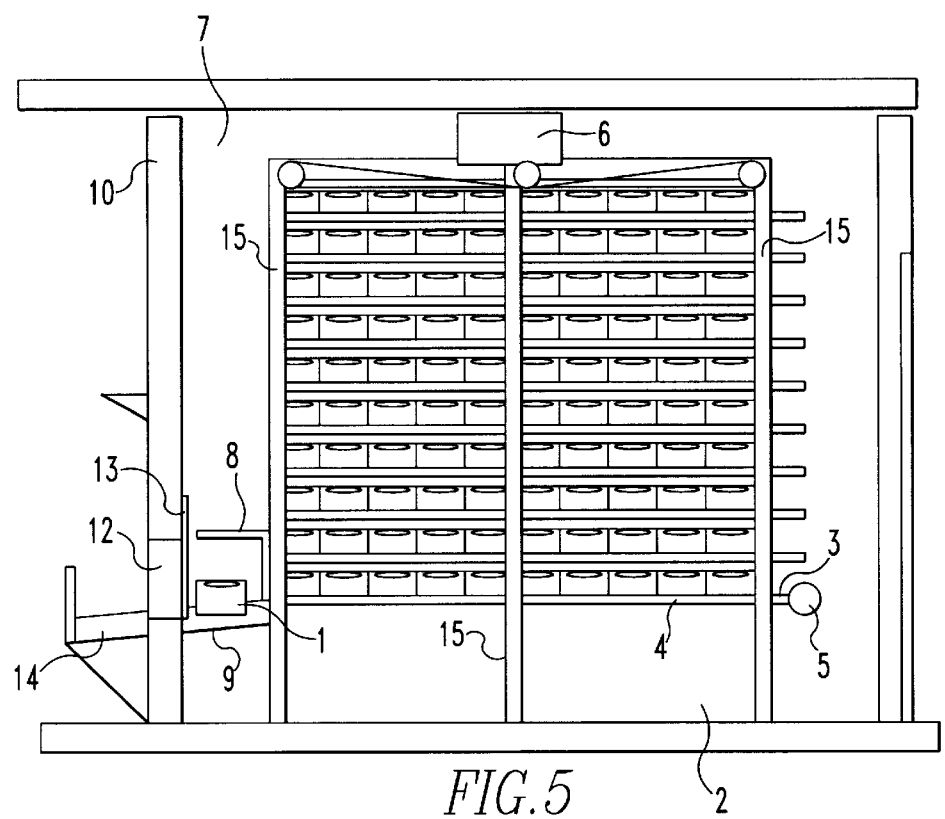
FIG. 5 shows a completely filled beverage vending machine.
Figure 6:
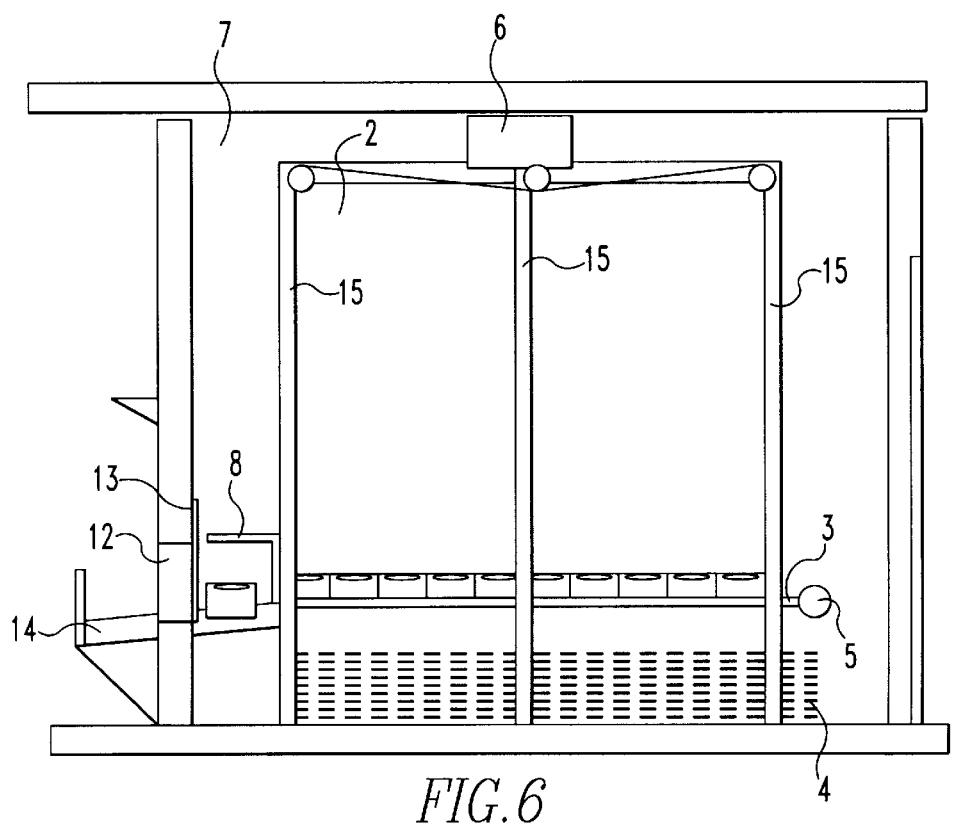
FIG. 6 shows a 90% empty beverage vending machine.

As shown in FIGS. 5 and 6, there is provided a first drive 5, which is disposed at the level of the first opening 11. The conveyor belts 4 include a drive shaft 3 which can be coupled to the first drive 5.

The conveyor belts 4 are guided by vertical guide tracks 15 and are interconnected by chains. The uppermost conveyor belt 4 is connected to a second drive 6 by which the conveyor belts can be lowered.

When the vending machine is filled the uppermost conveyor belt is disposed in the uppermost position just below the second drive 6. Then the lowermost conveyor belt 4 is at the level of the first opening 11. In this state, the drive shaft 3 of the lowermost conveyor belt is coupled with the first drive 5.

For dispensing a beverage case 1 from the vending machine according to the invention; first the first opening 11 is opened by opening the first slide door 8 as it is shown in FIG. 3. Then, the lowermost conveyor belt 4 is operated by the first drive 5 so as to move the beverage case 1 at the front end of the conveyor belt 3 forwardly onto the dispensing belt 9 and into the intermediate space 7.

After the beverage case 1 has been moved by the lowermost conveyor belt 4 forwardly such that it is disposed on the dispensing belt 9, it is moved by the dispensing belt 9 fully into the intermediate space 7.

When the beverage case 1 is disposed completely within the intermediate space 7, the first opening 11 is again closed by the slide door 8 as it is shown in FIG. 1. Then the second opening 12 is opened by moving the slide door 13, and the beverage case 1 is moved by the dispensing belt 4 onto the dispensing element 14. This state is shown in FIG. 2.

When the beverage case 1 is disposed fully on the dispensing element 14, the slide door 13 closes the second opening 12 again. Then a second beverage crate dispensing procedure can be initiated.

After the lowermost conveyor belt 4 has been fully emptied, the conveyor belts 4 are lowered by the second drive 6 until the next loaded conveyor belt 4 is disposed at the level of the first opening 11. In this position, the drive shaft 3 of the next conveyor belt 4 is coupled with the first drive 5. Then the dispensing procedure as described before can be repeated for the next conveyor belt.

After this conveyor belt 4 is also emptied, the conveyor belts 4 are again lowered until the subsequent conveyor belt 4 is at the level of the first opening 11.

This procedure is repeated until the uppermost conveyor belt is disposed at the level of the first opening 11. Since the conveyor belts 4 are interconnected by chains, they are disposed below the first opening 11 on top of each other without gap as it is shown in FIG. 6.

Figure 4:
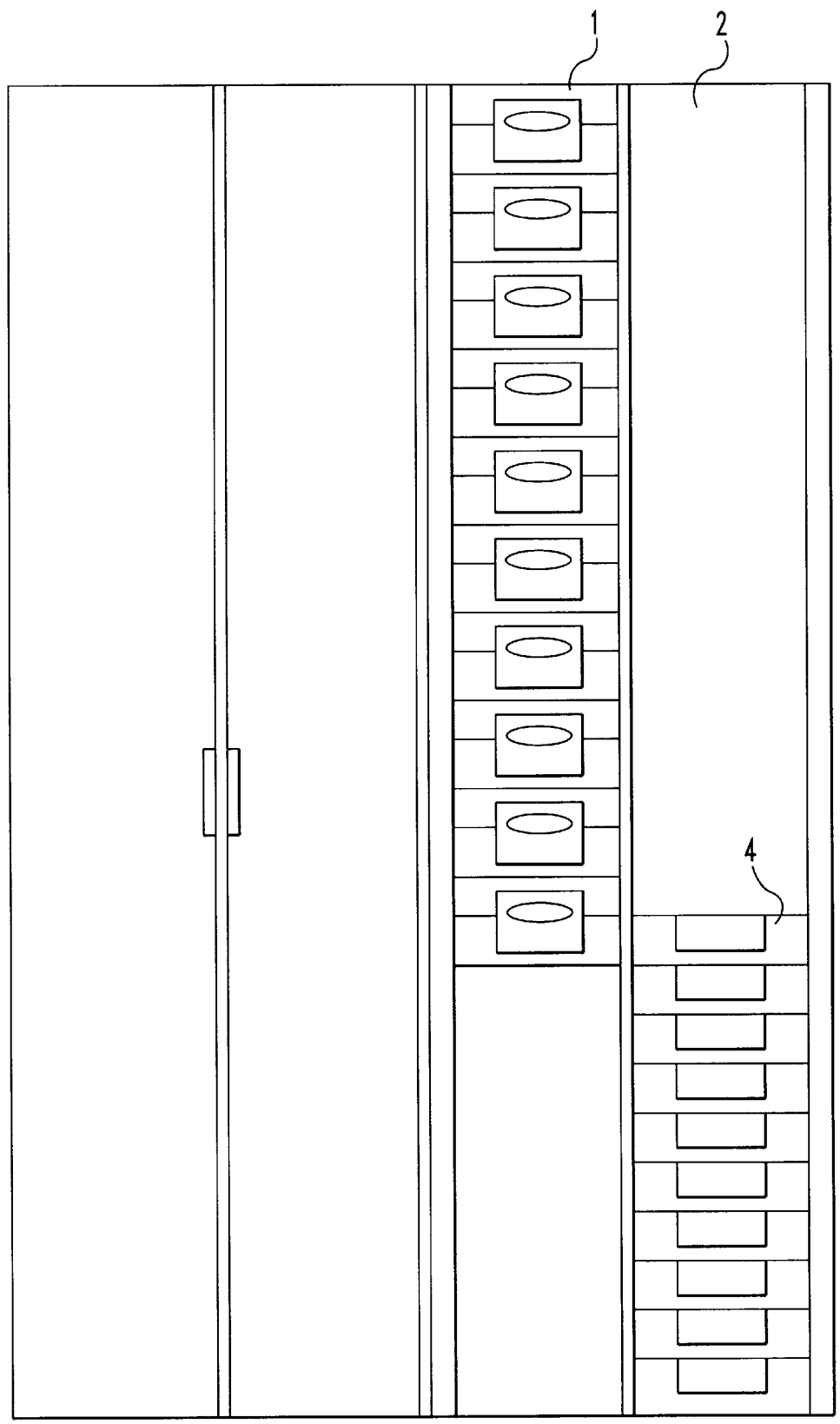
FIG. 4 is a rear view of beverage vending machines placed side-by-side.

FIG. 4 shows four vending machine units arranged in side-by-side relationship with the rear walls removed from the two units shown at the right side of FIG. 4.

In the arrangement as shown in FIG. 4, the right vending machine unit is emptied, that is, all the conveyor belts 4 are disposed on top of one another and without gap therebetween at the bottom of the unit. The vending machine unit next to it is completely filled such that the lowermost conveyor belt 4 is disposed at the level of the first opening 11 and the uppermost conveyor belt 4 is disposed just below the second drive 6.

Figure 7:
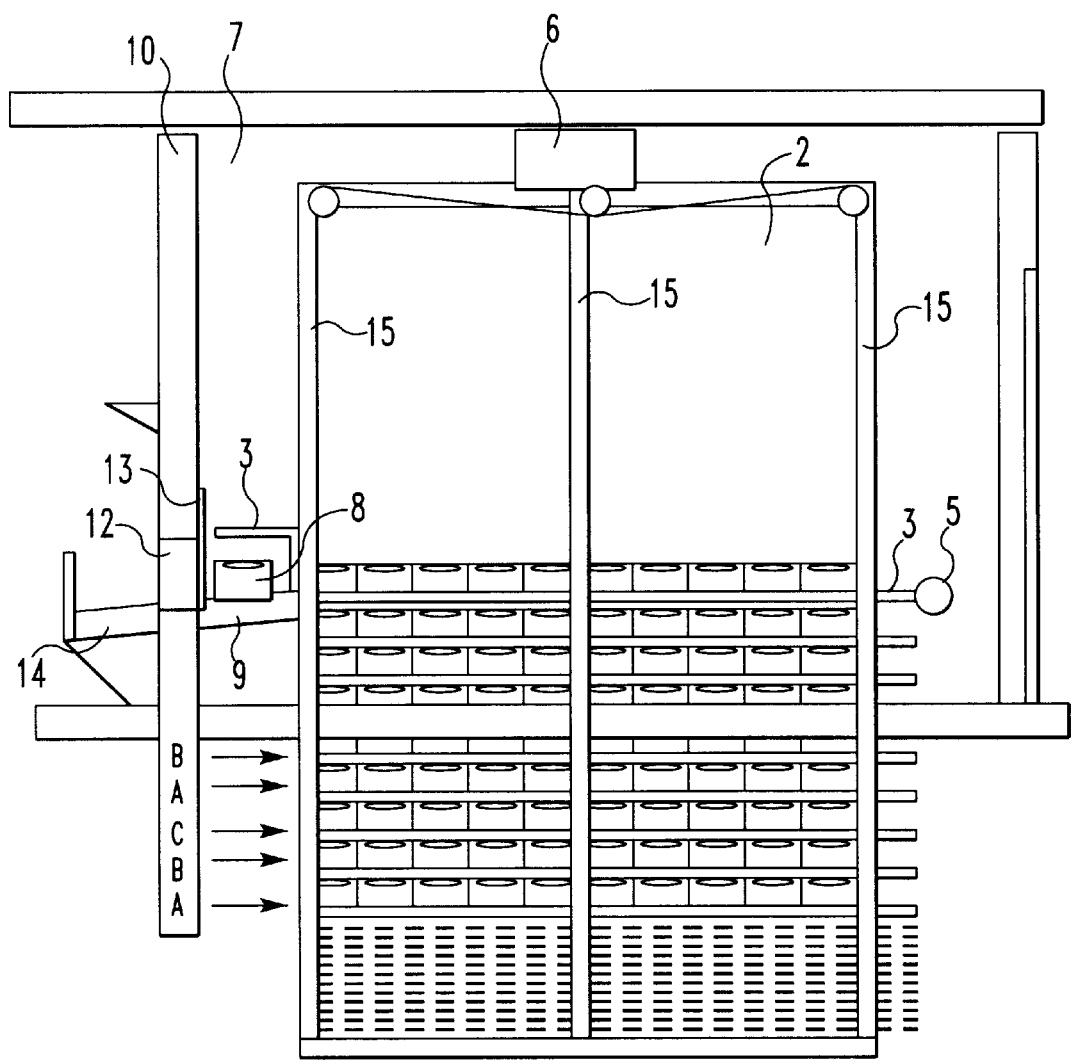
FIG. 7 shows another embodiment of the beverage vending machine according to the invention for dispensing different types of beverages.

The vending machine shown in FIG. 7 is loaded with three different types of beverages. In this embodiment, a control arrangement is provided which positions a conveyor belt carrying the desired beverage to the level of the first opening 11. The beverage cases are so arranged in the vending machine that four cases with a first beverage are disposed on the lowermost conveyor belt and four cases of the second beverage are disposed on the second conveyor belt disposed above the lowermost conveyor belt. Four cases of a third beverage may be disposed on the third conveyor belt disposed above the second conveyor belt. The fourth conveyor belt above the third conveyor belt carries again cases of the first beverage and so on.

In order to make it possible to remove from the vending machine cases of the third beverage even if the two conveyor belts below are not yet fully emptied the space below the first opening must be enlarged since the conveyor belts below which still carry beverage cans cannot be disposed directly on top of each other. To obtain the enlarged space, the vending machine is therefore preferably enlarged downwardly into the ground or the floor so that the dispensing opening and the dispensing element 14 remain at a level above the floor convenient for the customer.

What is claimed is:

1. A beverage vending machine for dispensing beverages contained in containers of which a number are disposed in beverage container crates, said vending machine including a storage space, a dispensing structure, at least two horizontal storage and transport elements disposed on top of one another within said storage space for supporting said beverage container crates adjacent one another, first drive means for horizontally moving said beverage container crates on said storage and transport elements, and second drive means for moving said storage and transport elements vertically, and means for moving said beverage container crates into said dispensing structure from a storage and transport element disposed at the same level as said dispensing structure.

2. A beverage vending machine according to claim 1, wherein said storage and transport elements are conveyor belts having a drive shaft with a drive coupling.

3. A beverage vending machine according to claim 2, wherein said conveyor belts are guided in vertical guide tracks and are interconnected by flexible elements.

4. A beverage vending machine according to claim 2, wherein said second drive means are connected to the uppermost conveyor belt.

5. A beverage vending machine according to claim 2, wherein said first drive means is coupled to the drive shaft of the conveyor belt disposed at the level of said dispensing structure.

6. A beverage vending machine according to claim 1, wherein said transport elements include guide tracks which guide said beverage container crates along the sides thereof.

7. A beverage vending machine according to claim 1, wherein said dispensing structure is in the form of a lock.

* * * * *